United States Patent Office 2,949,126
Patented Aug. 16, 1960

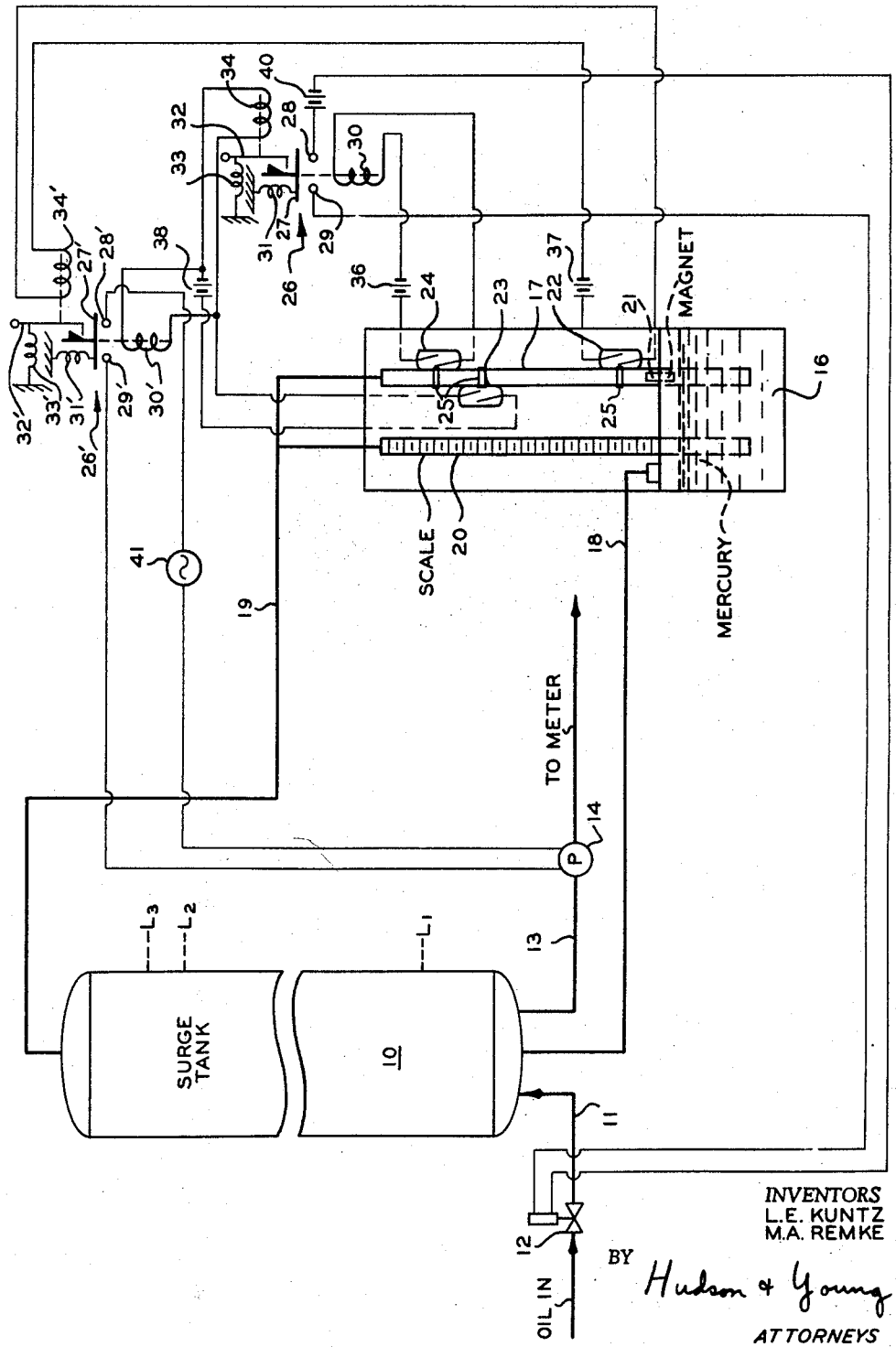

2,949,126

LIQUID LEVEL CONTROL

Louis E. Kuntz and Marvin A. Remke, Bartlesville, Okla., assignors to Phillips Petroleum Company, a corporation of Delaware Filed Aug. 1, 1958, Ser. No. 752,610

2 Claims. (Cl. 137—207)

This invention relates to the measurement and control of liquid levels.

In various industrial operations there is a need for apparatus to detect liquid levels in fluid containers. For example, in the petroleum industry, crude oil from a number of wells is often accumulated at a gathering station where it is metered and delivered to a pipeline. Automatic lease custody transfer systems are presently being developed to perform this metering operation automatically by filling and emptying tanks of known volume repetitively and counting the number of cycles. In operations of this type the transfer of oil between the several tanks employed is controlled by measuring liquid levels in the tanks.

Various types of liquid level responsive switches are well known in the art and have been employed in operations of this sort. These known liquid level responsive switches include floats which provide a mechanical displacement when lifted by rising liquid levels. Other types of switches comprise electrically actuated means which provide signals representative of the liquid levels. However, nearly all of these known switches have a number of disadvantages. Mechanical devices often tend to stick, and electrical switches may present explosive hazards. Furthermore, the installation of these switches in storage tanks is a difficult and expensive procedure because a plurality of openings generally must be cut in the sides of the tanks. The control apparatus which is actuated by these switches usually is positioned remotely from the tanks so that a plurality of telemetering systems must be employed to transmit signals representative of the measured liquid levels to the control equipment.

In accordance with the present invention, an improved liquid level control system is provided which is adapted to measure liquid levels in a fluid container at a region remote from the container. A manometer tube is connected by pressure transmitting lines to the top and bottom of the container to be measured so that the level of a liquid in the manometer tube is representative of the liquid level in the container. A dense liquid such as mercury can be employed to advantage so that the height of the manometer tube is substantially less than the height of the container being measured. Liquid level responsive devices associated with the manometer tube thus provide signals representative of the level of the liquid in the container. These liquid level responsive devices can advantageously be reed switches which are actuated by a magnet that floats on the liquid in the manometer tube. The manometer tube, or an auxiliary tube, can be calibrated to provide a visual indication of the liquid level.

Accordingly, it is an object of this invention to provide apparatus for measuring liquid levels in fluid containers at a region remote from the container.

Another object is to provide liquid level control apparatus which also provides a visual indication of the liquid level in the container being measured.

A further object is to provide a simplified liquid level control system which is reliable in operation and which eliminates explosive hazards.

Other objects, advantages and features of the invention should become apparent from the following detailed description, taken in conjunction with the accompanying drawing which is a schematic representation of an embodiment of the liquid level control system of this invention:

Referring now to the drawing in detail, there is shown a surge tank 10 which is employed in conjunction with an automatic lease custody transfer system. Oil from a plurality of wells is introduced into surge tank 10 by means of a conduit 11 which has an electrically operated control valve 12 therein. Oil is removed from surge tank 10 through a conduit 13 which has a pump 14 therein. Conduit 13 delivers oil to a metering system which can advantageously be of the type described in copending application, Serial No. 686,255, filed September 25, 1957, now abandoned. The surge tank is employed so that oil can be delivered to the metering system at a constant rate and only at such time as there is a sufficient volume of oil available to fill the metering tank. The flow of oil into and out of tank 10 is controlled in response to measurements of the liquid level within the tank.

The liquid level control apparatus of this invention comprises a tank 16 which contains mercury or some other dense liquid. A first manometer tube 17 is submerged in and extends upwardly from tank 16. A conduit 18 communicates between the bottom of surge tank 10 and the top of tank 16 so that a pressure is applied to the surface of the mercury in tank 16 which represents the pressure in the bottom of tank 10, and thus the height of liquid in the tank. A conduit 19 communicates between the top of tank 10 and the upper end of manometer tube 17 to equalize pressures. It should thus be evident that the mercury in tank 16 is displaced upwardly in tube 17 to a level which corresponds to the level of the oil in tank 10. A second manometer tube 20 is connected in parallel with tube 17. Tube 20 can be calibrated so that a visual indication of the liquid level in tank 10 is provided. If desired, tube 17 can be transparent and can be calibrated to eliminate the need for tube 20. A permanent magnet 21 is positioned within tube 17 to float on the surface of the mercury. A plurality of magnetically operated reed switches 22, 23 and 24 are adjustably mounted adjacent tube 17 by clamps 25 at levels which correspond to respective levels $L_1$, $L_2$ and $L_3$ in surge tank 10. These switches include one or more members of magnetic material which are moved to complete an electrical circuit by magnet 21. Tank 16 and tube 17 are formed of non-magnetic material.

Inlet valve 12 and transfer pump 14 are controlled by latching relays 26 and 26' which are actuated by switches 22, 23 and 24. Relay 26 comprises a switch arm 27 which engages contacts 28 and 29 when a solenoid 30 is energized. Switch arm 27 normally is retained out of engagement with these contacts by means of a bias spring 31. A latching arm 32 is biased by a spring 33 so as to retain switch arm 27 in engagement with contacts 28 and 29 after solenoid 30 has been energized. Latching arm 32 is released when a solenoid 34 is energized. Relay 26' is identical to relay 26 and corresponding elements are indicated by like primed reference numerals.

Switch 24 and a current source 36 are connected in circuit with solenoid 30. Switch 22 and a current source 37 are connected in circuit with solenoid 34'. Switch 23 and a current source 38 are connected in circuit with both solenoid 34 and solenoid 30'. A current source 40 and the actuating coil of valve 12 are connected between contacts 28 and 29. A current source 41 and pump 14 are connected between contacts 28' and 29'.

At the beginning of the operation, it is assumed that tank 10 is empty so that magnet 21 is positioned below switch 22. Valve 12, which is open in the absence of current being supplied thereto, initially is open so that oil is introduced into tank 10 from conduit 11. When the oil level rises to level $L_1$, magnet 21 closes switch 22. This energizes solenoid 34'. However, switch arm 27' is initially out of engagement with contacts 28' and 29' so that solenoid 34' does not influence relay 26'. Switch 22 opens again after magnet 21 moves above level $L_1$. The oil continues to rise in tank 10 until level $L_2$ is reached. This results in magnet 21 closing switch 23 so that solenoids 30' and 34 are energized. Solenoid 30' moves switch arm 27' into engagement with contacts 28' and 29' so that transfer pump 14 is energized. Arm 32' latches relay 26' in this position. Coil 34 does not influence relay 26 because switch arm 27 is out of engagement with contacts 28 and 29. Under normal conditions of operation, oil is removed through conduit 13 at a rate which is approximately equal to the rate at which oil enters tank 10 so that the liquid level fluctuates about level $L_2$. There is no change in the operation of relays 26 and 26' as long as the oil does not reach either level $L_1$ or level $L_3$.

If the oil should fall to level $L_1$, switch 22 is again closed to energize solenoid 34'. Since solenoid 30' is not energized at this time, latching arm 32' is released so that switch arm 27' is moved out of engagement with contacts 28' and 29'. This deenergizes transfer pump 14. The transfer pump remains deenergized until such time as the oil again rises to level $L_2$. If the oil should rise to level $L_3$, switch 24 is closed to energize solenoid 30. This moves switch arm 27 into engagement with contacts 28 and 29 to actuate valve 12 and cause the valve to close. No additional oil is introduced into tank 10 until the oil falls to level $L_2$, at which time switch 23 is closed to energize solenoid 34 and release latching arm 32.

It should thus be evident that the switches associated with the liquid level measuring apparatus control tank 10 in the desired manner.

While the apparatus of this invention has been described in conjunction with an automatic lease custody transfer system, it should be evident that the liquid level measuring device is not restricted thereto and can be employed to advantage in any system wherein it is desired to control liquid levels. The apparatus of this invention is compact because manometer tube 17 does not need to be nearly as tall as tank 10 due to the greater density of the mercury. All of the liquid level switches can be located at a common region which can be remote from the tank being measured. Another advantage of the system results from the fact that only single openings in the top and bottom of the tank are required. This eliminates the need for a plurality of openings at spaced locations on the side of the tank. Furthermore, the positions of the switches adjacent tube 17 can readily be varied for different operations. This avoids the need for drilling new holes in the side of the tank, as is required by many level sensing devices. It is thus believed evident that the liquid level control system of this invention offers several decided advantages over conventional systems employed heretofore.

While the invention has been described in conjunction with a present preferred embodiment, it should be evident that it is not limited thereto.

What is claimed is:

1. Apparatus for controlling the flow of liquid comprising a tank; first conduit means communicating with said tank to introduce liquid therein; a valve in said first conduit means; second conduit means communicating with the bottom of said tank to remove liquid from said tank; a pump in said second conduit means; an upright conduit; a liquid reservoir communicating with the lower end of said conduit; said reservoir being adapted to contain a liquid immiscible with and of greater density than the liquid in the tank to be measured; third conduit means communicating between the bottom of said tank and said reservoir so that the pressure exerted by liquid in said tank tends to displace the liquid in said reservoir upwardly in said upright conduit to a height representative of the height of liquid in said tank; fourth conduit means communicating between the top of said tank and the top of said upright conduit so that the pressure in said tank is applied to said upright conduit; first, second and third level indicating means associated with said upright conduit to measure levels of fluid therein at respective first, second and third progressively higher levels; means responsive to said second level indicating means to actuate said pump when liquid rises to said second level; means responsive to said third level indicating means to close said valve when liquid is above said third level; and means to stop said pump when liquid is below said first level.

2. The apparatus of claim 1 wherein said level indicating means comprise first, second and third magnetically operated electrical switches positioned adjacent said upright conduit at said first, second and third levels, respectively; and a magnet positioned within said upright conduit to float on the surface of liquid therein.

References Cited in the file of this patent

UNITED STATES PATENTS

| | | |
|---|---|---|
| 347,589 | Ghegan | Aug. 17, 1886 |
| 1,346,898 | Kingsbury | July 20, 1920 |
| 1,981,530 | Thomas | Nov. 20, 1934 |
| 2,239,157 | Lowe | Apr. 22, 1941 |
| 2,243,188 | Biach | May 27, 1941 |
| 2,487,933 | Martin | Nov. 15, 1949 |
| 2,856,775 | Niles | Oct. 21, 1958 |